(12) United States Patent
Andre

(10) Patent No.: US 8,336,901 B2
(45) Date of Patent: Dec. 25, 2012

(54) INTERCOMMUNICATING GANGWAY BETWEEN AT LEAST TWO ROAD MODULES DETACHABLY CONNECTED TO FORM A ROAD TRAIN OR SET

(75) Inventor: Jean-Luc Andre, Mosheim (FR)

(73) Assignee: Lohr Industrie, Hangenbieten (FR)

( * ) Notice: Subject to any disclaimer, the term of this patent is extended or adjusted under 35 U.S.C. 154(b) by 147 days.

(21) Appl. No.: 12/990,900

(22) PCT Filed: Apr. 29, 2009

(86) PCT No.: PCT/FR2009/000504
§ 371 (c)(1),
(2), (4) Date: Jan. 6, 2011

(87) PCT Pub. No.: WO2009/138590
PCT Pub. Date: Nov. 19, 2009

(65) Prior Publication Data
US 2011/0089666 A1 Apr. 21, 2011

(30) Foreign Application Priority Data
May 6, 2008 (FR) ..................................... 08 02520

(51) Int. Cl.
*B60D 5/00* (2006.01)
(52) U.S. Cl. .......................................... 280/403; 105/8.1
(58) Field of Classification Search ................... 280/403; 105/1.4, 8.1, 19–21, 16–17, 7, 5, 9, 10
See application file for complete search history.

(56) References Cited

U.S. PATENT DOCUMENTS

| 3,712,244 | A | * | 1/1973 | Vollenweider et al. | 105/21 |
| 4,421,339 | A | * | 12/1983 | Hagin | 280/460.1 |
| 4,765,249 | A | * | 8/1988 | Ishizuka et al. | 105/10 |
| 4,794,867 | A | | 1/1989 | Titz | |
| 5,823,117 | A | * | 10/1998 | Ommerli | 105/8.1 |
| 7,658,396 | B2 | | 2/2010 | Koch et al. | |
| 2006/0170188 | A1 | | 8/2006 | Negre et al. | |
| 2010/0044998 | A1 | | 2/2010 | Franchineau | |

FOREIGN PATENT DOCUMENTS

| DE | 44 11 241 A1 | 10/1995 |
| DE | 10 2005 035 561 A1 | 3/2007 |
| EP | 0 277 305 A1 | 8/1988 |
| EP | 0 536 433 A1 | 4/1993 |
| EP | 1 864 834 A1 | 12/2007 |
| FR | 712 379 | 10/1931 |
| FR | 2 930 928 A1 | 11/2009 |
| JP | 2000 247266 A | 9/2000 |
| WO | 00/46050 A1 | 10/2000 |
| WO | 2004/014715 A2 | 2/2004 |
| WO | WO 2004014715 A2 * | 2/2004 |
| WO | 2007/132121 A1 | 11/2007 |

* cited by examiner

*Primary Examiner* — Tashiana Adams
(74) *Attorney, Agent, or Firm* — Davis & Bujold, PLLC

(57) ABSTRACT

An intercommunicating gangway in that two successive road modules (5, 6) are connected by a detachable coupling with a minimum inter-module distance at least in the in-line configuration such that the opposite facing surfaces (3, 4) are each provided with a communicating door (8, 9) which can only be opened in when the two road modules are arranged in an in-line configuration and the vehicle is stopped. The intercommunicating gangway is suitable for use in the urban passenger transport field.

12 Claims, 2 Drawing Sheets

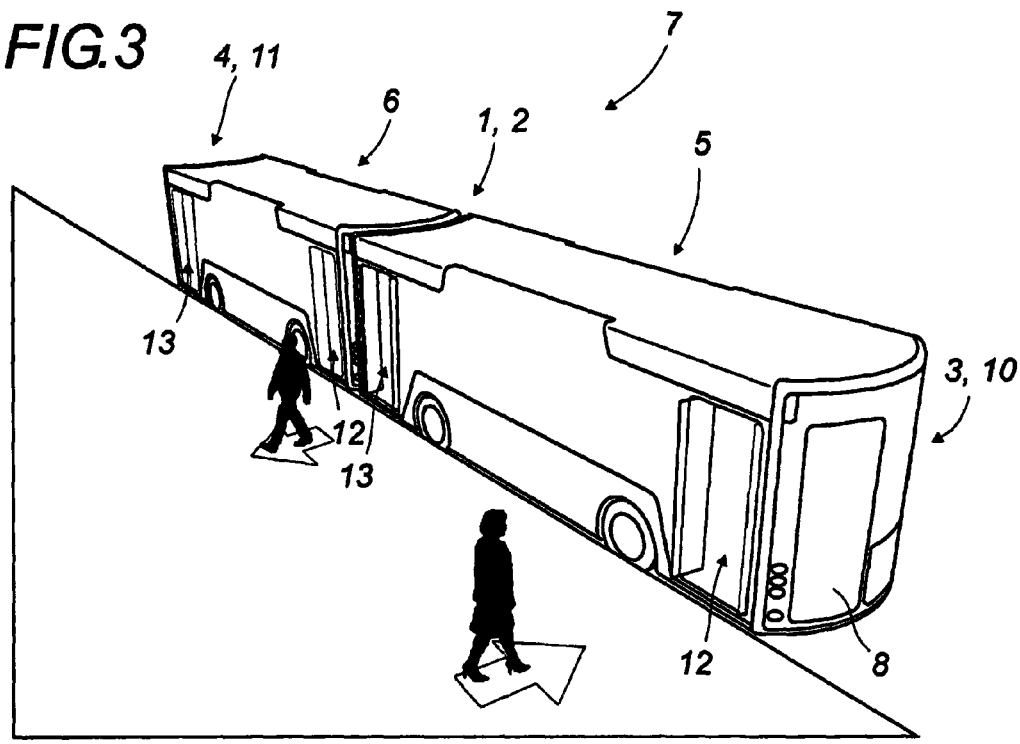
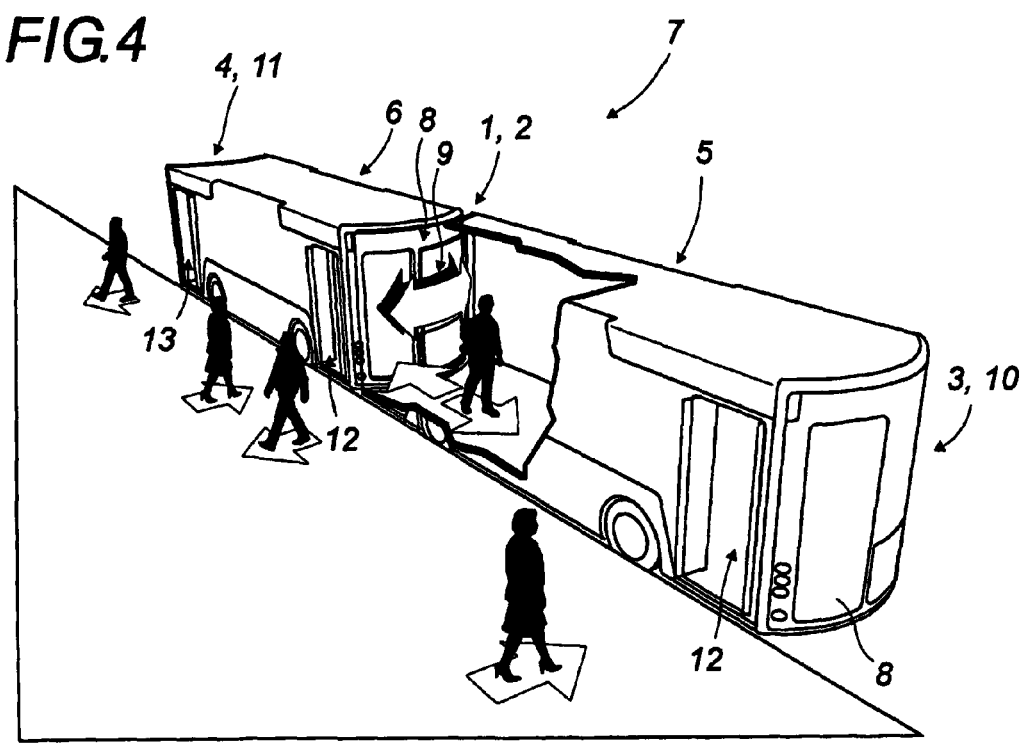

INTERCOMMUNICATING GANGWAY BETWEEN AT LEAST TWO ROAD MODULES DETACHABLY CONNECTED TO FORM A ROAD TRAIN OR SET

This application is a National Stage completion of PCT/FR2009/000504 filed Apr. 29, 2009, which claims priority from French patent application serial no. 08/02520 filed May 6, 2008.

FIELD OF THE INVENTION

The present invention relates to an intercommunicating gangway between two successive motor-driven road modules in a road train set of road modules consisting of a plurality of motor-driven road modules articulated to one another by a disconnectable articulated connection with minimal inter-module space at least in a straight line configuration.

SUMMARY OF THE INVENTION

In order to form a short interconnecting gangway in a straight line configuration between two successive road modules, a hitching means is used to ensure that at least when in a straight line, a minimum amount of space exists between the two opposing front and rear surfaces of two successive modules.

According to one particular embodiment, the two opposite facing surfaces are curved and preferably circular.

This configuration reduces the intermediate inter-module space to a small, minimum amount, yet it is compatible with safety standards and eliminates the need for a protective pneumatic connection for passenger circulation and prevents passengers from boarding the modules transversely from the outside by crossing the intercommunicating gangway. This risk is considerable when there are crowds or before departures, just after the main doors have been closed.

The field of urban and inter-urban road vehicle passenger transportation is currently turning to solutions that utilize trains formed as a series of several motor driven independent modules in isolation, but which can be grouped rapidly into a series or train set for travel on public routes.

The flexibility and modular nature of this public urban transportation system make it particularly attractive from all points of view to urban administrators seeking public transportation equipment.

It is actually possible for each road module to independently follow a suburban route and then be connected to other modules before arriving at the center of a city, forming a train series or a train set with one driver for the head module, and then to be disconnected after passing through the center of the city into independent modules accommodating the particular needs of passengers traveling in specific, diverse directions to suburban destinations.

Implementing this transportation technique imposes the necessity for passengers to pass easily and in complete safety from one module to another without disembarking from the car. It is necessary to provide a hitching device between these modules, as the following modules have no driver. This mechanical or intangible hitching device at the very least directs the following passenger vehicles through curves and aligns them at stops with a minimum distance between the modules.

A device with a telescoping drawbar and retractable folding intercirculation pneumatic connector is already known in the art as described in Publication WO 2007/132121.

In order to best resolve the problem set forth above, it is necessary to have the shortest possible inter-module space and preferably one that is predisposed for passenger intercommunication.

Several types of intercommunicating gangways between modules articulated to one another are already known.

These gangways, in their basic version, comprise at the lower portion freely pivoting plates that overlap one another for lower protection and for supporting passengers as they walk in both straight lines and on curves.

This pneumatic connection technique is expensive, cumbersome and awkward. In actuality, the pneumatic connector, which is relatively long when deployed in order to accommodate module displacement, especially on curves, proves to be heavy and bulky when compressed. The deployment-compression mechanism for pneumatic connectors is complex. Finally, since the length of an articulated convoy is strictly limited, it follows that the length of the pneumatic connector would considerably decrease the length of the modules. This limits the use of one vehicle in isolation.

To facilitate passenger circulation between road modules of a train when grouped and in a straight line configuration, intercommunicating gangways are provided which are accessible and can be used by passengers only when the train is in a straight line, specifically during stops at a railway station or stop; they are of minimal length and short enough to eliminate the need for pneumatic connectors, while preventing rushed, distracted or dishonest passengers from the danger of boarding laterally and also preventing a user from becoming wedged between doors.

Furthermore, for safety reasons, it is only possible to circulate by passing through two doors that face each other, which the passengers can open only when the train is in straight line configuration and preferably stopped, with safety controls identical to those used for the side doors.

This, therefore, is a global safety measure. On the one hand, the intercommunicating gangway is accessible only in straight line configuration and on the other hand, laterally penetrating the intercommunication space, although forbidden to passengers, is now impossible because the space is exceptionally narrow.

Additionally, this solution eliminates the need for a pneumatic connector, while providing equivalent safety and protection. A baffle or a flexible seal can be provided at the upper portion to keep water from entering when the communicating doors are open.

BRIEF DESCRIPTION OF THE DRAWINGS

Other features and advantages of the invention will become apparent from the following description provided by way of example and from the accompanying drawings, in which:

FIG. 3 is a schematic perspective view showing two road modules of the same type connected to each other with minimal intermediate, inter-module space;

FIG. 4 is a schematic perspective with a cut-away showing the opening of a door communicating between modules.

DETAILED DESCRIPTION OF THE PREFERRED EMBODIMENTS

The present invention concerns a narrow intercommunicating gangway 1 with no pneumatic connector between two successive road modules of any number of road modules interconnected one after the other. These road modules are also connected to each other by any type of inter-module connection, but one which aligns the modules and minimizes the distance between two opposite facing surfaces of two successive road modules when in a straight line.

Figure 1:
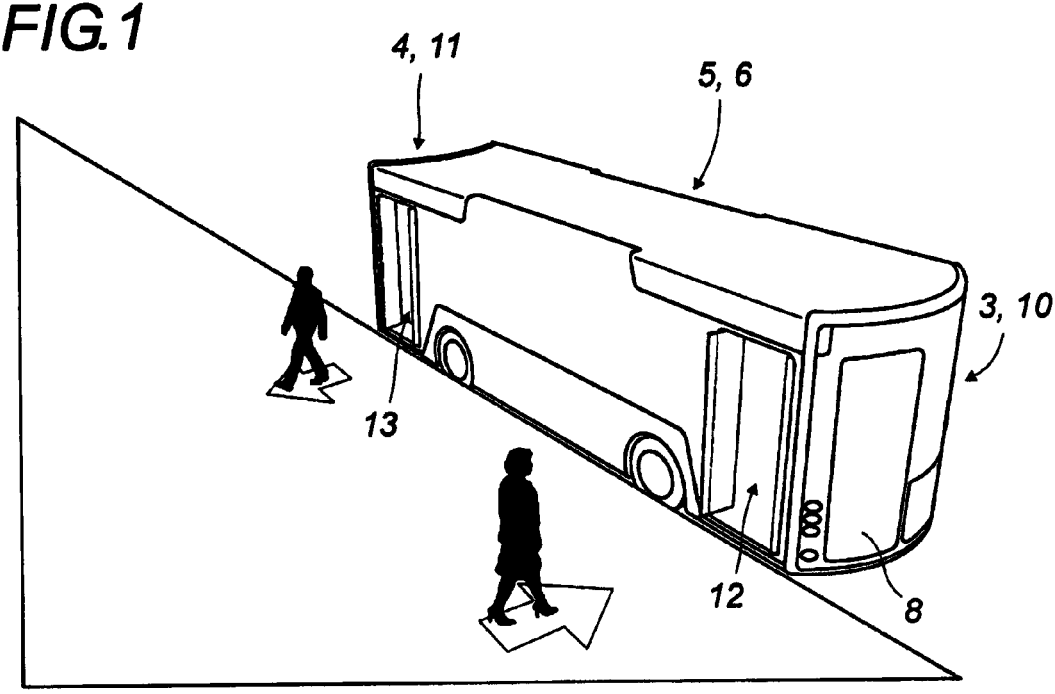
FIG. 1 is a schematic perspective view of an isolated road module showing passengers using the lateral doors.
Figure 2:
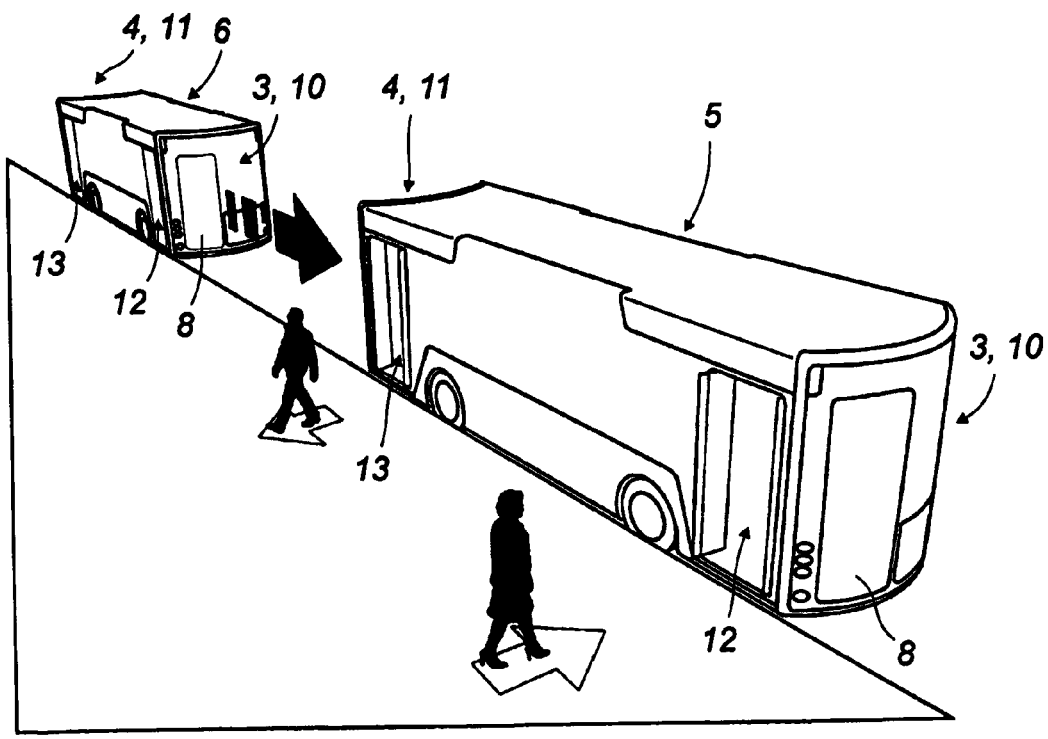
FIG. 2 is a schematic perspective view illustrating the approach of a second road module prior to connection.

The intercommunicating gangway 1 is located in the intermediate space 2 existing between the two opposite rear and front facing surfaces 3 and 4 of two successive road modules, one a leading module 5 and the other a trailing module 6, in a road train 7 formed of a plurality of motor-driven road modules with at least two successive road modules as shown in FIGS. 2, 3 and 4.

Each of these face surfaces 3 and 4 has at least one communicating door 8 and 9, respectively, and a generally projecting, non-interfering shape when on curves, for example, a curved shape, particularly circular, a convex surface 10 and a concave surface 11 as shown in the drawings.

When they are circular in shape, the center of the circle defining the shapes is preferably but not necessarily the pivot center for the disconnectable articulation joining two successive modules 5 and 6 to each other.

Obviously opposite facing surfaces 3 and 4 may or may not have a different projecting shape. This is especially true with small capacity modules.

Intercommunicating doors 8 and 9 are provided on each of the facing surfaces 3 and 4 in opposite locations so as to face one another when in straight line configuration.

Doors 8 and 9 are preferably sliding doors, that is, they open by disappearing inside the adjacent face surface.

They may be curved to integrate perfectly with the adjacent face surface.

Opening these doors will be permitted only when in straight line configuration and at least during stops at a train station or stop, as with the lateral doors, for example.

The lower portion for the intercommunicating gangway may be formed of a fixed projecting and overlapping platform provided on the rear of leading road module 5, generally level with the floors of the two successive road modules 5 and 6 that are disconnectably articulated to one another and which compose the road train 7.

The fixed platform could just as easily project from the front of the trailing module 6, specifically, at the front of its forward face surface 4.

If the hitching device between modules results in a very shortened distance, it is no longer necessary to provide a passageway platform because there can be direct access from one module to the other.

Travelers pass from one module to another in a completely natural manner without any change in level and over a minimal distance, which is the distance of the intermediate space 2 existing between two opposite face surfaces 3 and 4 at least in a straight line configuration.

This platform also affords mechanical protection from the rapid coupling and uncoupling means for the articulation of the disconnectable connection between the two road modules.

Overhead protection (not shown) may be provided by an overhead fixed, projecting portion extending across the entire interval from one or the other of the two opposing front surfaces or along a portion of the inter-module interval from each of the opposing face surfaces like a canopy.

A central device associated with the general operational system controls the opening of the doors to the intercommunicating gangway.

For example, opening will occur automatically upon issuance of a specific command by a passenger, followed by the opening action when allowed during a stop.

This may be the initial opening and the doors will remain open until the moment of departure, when the doors will close automatically.

The opening and closing functions may be automatic using radar or other types of sensors.

In general, safety control for the intercommunicating doors is identical to the control used for the lateral doors.

The general illustration in FIG. 4 concerns the route taken by passengers during a stop.

Front lateral access doors 12 and rear doors 13 are open during a stop for passengers to embark or disembark at a train station or stop. At the same time, communicating doors 8 and 9 are allowed to operate. They open on demand or automatically upon detection of a passenger at the entry, allowing him or her to cross intercommunicating space 2 and access the neighboring module or even exit the train through the neighboring module.

It is important for intercommunicating gangway 1 to be as short as possible for a quick crossing that requires only a little protection, but also to make it impossible for unauthorized passengers to enter or exit transversely, as this is dangerous, or to prevent a child from being wedged between these two closed doors, for example.

The invention adds these important advantages to the intercommunication advantages related to the subject transportation system.

The present invention is also independent of the type of connection and the type of hitching or articulation device between road modules. It may be either mechanical or intangible, that is, without physical support. It is only necessary for it to be disconnectable and that the two successive road modules thus connected be close enough together, at least when in a straight line, and preferably but not necessarily, that the connection comprise a trajectory setting device for trailing module 6.

The invention claimed is:

1. An interconnecting gangway between first and second successive road modules, the first being a leading module (5) and the second being a trailing module (6), each of the first and the second modules have a motor-drive and being independent of the other,
   each of the first and the second modules having at least one lateral access door (12, 13) and at least one communicating door (8, 9), and the first and the second modules being interconnected by an inter-module connection to form either a series or a road train set,
   the inter-module connection being disconnectable and allowing a minimal inter-module distance to be obtained at least in a straight line configuration of the two modules, and to resume alignment after curves,
   opposite front and rear face surfaces (3, 4) of each of the first and the second modules possess one of the communicating doors (8, 9) for accessing the interconnecting gangway which is only allowed access when the first and the second modules are stop at one at a train station and a stop and aligned with one another in the straight line configuration.

2. The intercommunicating gangway according to claim 1, further comprising a device to set a trajectory of the trailing module (6).

3. The intercommunicating gangway according to claim 1, wherein the disconnectable inter-module connection is an articulated connection.

4. The intercommunicating gangway according to claim 1, wherein the disconnectable inter-module connection is a short hitching device.

5. The intercommunicating gangway according to claim 1, wherein the disconnectable inter-module connection is intangible.

6. The intercommunicating gangway according to claim 1, wherein an intercommunicating platform serves as a floor and projects from the rear face surface (4) of the leading module (5).

7. The intercommunicating gangway according to claim 1, wherein an intercommunicating platform serves as a floor and projects from the forward face surface (3) of the trailing module (6).

8. The intercommunicating gangway according to claim 1, wherein upper portions of the front and the rear face surfaces (3, 4) have a projecting canopy for overhead protection.

9. The intercommunicating gangway according to claim 1, wherein one upper portion of the front and the rear face surfaces (3, 4) has a projecting canopy for overhead protection.

10. The intercommunicating gangway according to claim 1, wherein the communicating doors (8, 9) are controlled such that the communicating doors (8, 9) only open when the first and the second modules are in the straight line configuration.

11. The intercommunicating gangway according to claim 1, wherein a safety control for controlling the communicating doors (8, 9) is identical to a control for the lateral doors (12, 13).

12. An interconnecting gangway between a leading road module (5) and a trailing road module (6), and each of the leading and the trailing road modules (5, 6) comprising an independent motor-drive, a front end (3) and a rear end (4), the front end (3) of each of the leading and the trailing road modules (5, 6) comprising a lateral access door (12, 13) and the rear end (4) of each of the leading and the trailing road modules (5, 6) comprising a communicating door (8, 9);

an inter-module connection couples the rear end (4) of the leading road module (5) and the front end (3) of the trailing road module (6) to form a train of road modules, and allows a minimal inter-module distance to be obtained at least when the leading road module (5) and the trailing road module (6) are coupled to one another and in a straight line configuration; and the communicating door (9) of the rear end (4) of the leading road module (5) and the communicating door (8) of the front end (3) of the trailing road module (6) being only opened, to facilitate access to the interconnecting gangway, when the leading road module (5) and the trailing road module (6) are stopped at either a train station or a stop and aligned in the straight line configuration.

* * * * *